J. H. WELCH & J. BAKER.
Improvement in Insect Traps.

No. 124,099. Patented Feb. 27, 1872.

Witnesses:
E. Wolff
Alex F. Roberts

Inventor:
John H. Welch
John Baker
per
Attorneys.

124,099

UNITED STATES PATENT OFFICE.

JOHN H. WELCH AND JOHN BAKER, OF FORT WAYNE, INDIANA.

IMPROVEMENT IN INSECT-TRAPS.

Specification forming part of Letters Patent No. 124,099, dated February 27, 1872.

Specification describing a new and Improved Insect-Trap, invented by JOHN H. WELCH and JOHN BAKER, of Fort Wayne, in the county of Allen and State of Indiana.

Figure 1:
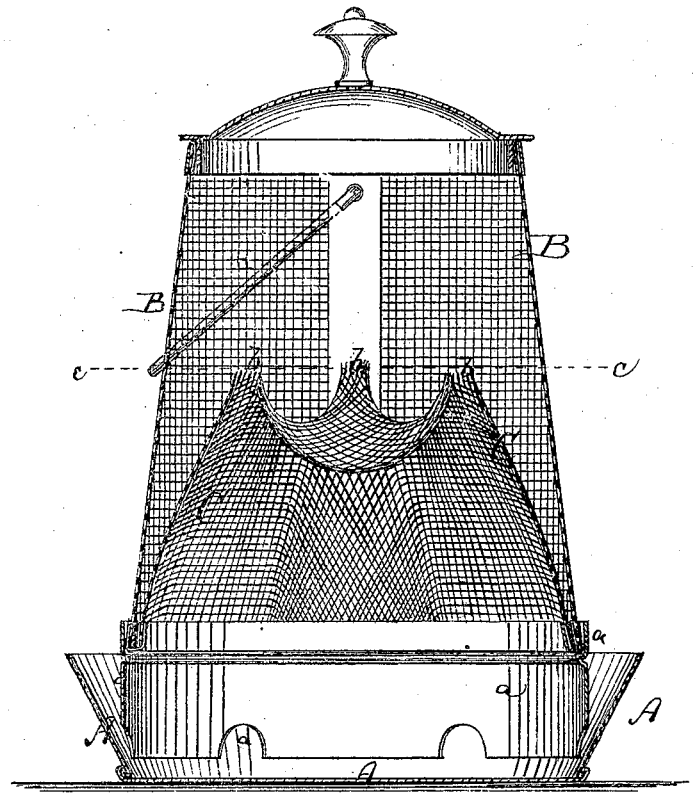
Figure 2:
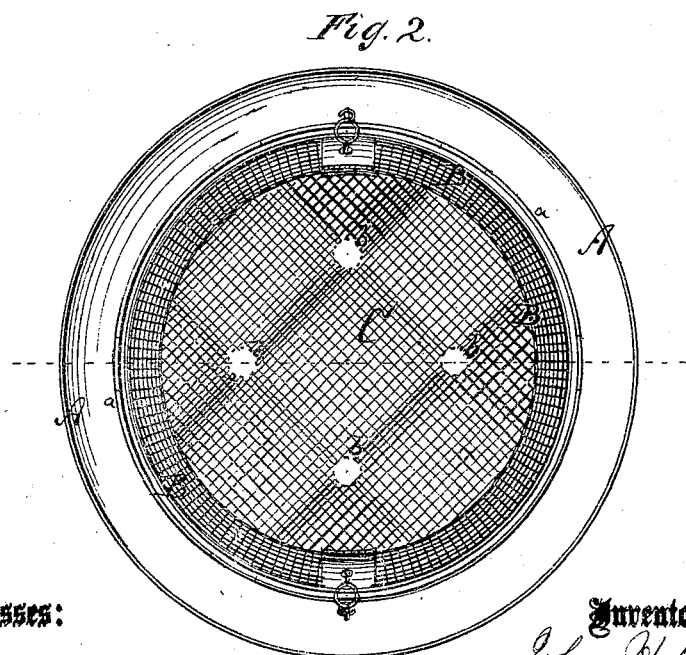

Figure 1 represents a vertical central section of our improved insect-trap. Fig. 2 is a horizontal section of the same on the line $c\ c$, Fig. 1.

Similar letters of reference indicate corresponding parts.

This invention relates to an insect-trap of peculiar construction, and from which the escape of the animals will be impossible when once they enter the inner part. The invention consists in a new general arrangement of parts.

A in the drawing represents a pan or dish of sheet metal or other suitable material, with an upright rim or flange, $a$, at the base of which are a number of small apertures, through which the animals can enter the pan. A wire cone, B, closed on top, surmounts the rim A. A second smaller wire cone, C, is arranged within B, joining the same at the bottom, but not reaching the top. In top of the cone C are a number of slots or apertures, $b\ b$, formed through the wire, the loose ends of the wire projecting outwardly. Suitable substance for attracting the insects being placed in the pan A, the animals will enter the same through the apertures in $a$. The lower part of the pan being dark they will ascend toward the light in the cone C, and finally pass through the apertures $b$. When once in the space between the cones B and C they are caught, as there are no means of escape except the holes $b$, to which access is prevented by the outwardly-protruding ends of wire.

Having thus described my invention, I claim as new, and desire to secure by Letters Patent—

The pan A, having apertured flange $a$, the wire cone B, closed on top, and the smaller wire cone C, within the cone B, and slotted at $b\ b$, all combined, constructed, and arranged as and for the purpose described.

JOHN H. WELCH.
JOHN BAKER.

Witnesses:
CONRAD BAKER,
ANDRU J. DILLINGHAM.